United States Patent
Lee

(10) Patent No.: US 8,095,271 B2
(45) Date of Patent: Jan. 10, 2012

(54) METHOD AND DEVICE FOR PROTECTING THE DRIVER DURING DRIVER-INDEPENDENT SUPERPOSITION OF STEERING MOMENTS

(75) Inventor: Wei-Chia Lee, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 987 days.

(21) Appl. No.: 11/667,425

(22) PCT Filed: Oct. 11, 2005

(86) PCT No.: PCT/EP2005/055158
§ 371 (c)(1),
(2), (4) Date: Feb. 28, 2008

(87) PCT Pub. No.: WO2006/056503
PCT Pub. Date: Jun. 1, 2006

(65) Prior Publication Data
US 2008/0255727 A1    Oct. 16, 2008

(30) Foreign Application Priority Data
Nov. 26, 2004 (DE) .................. 10 2004 057 262

(51) Int. Cl.
*B62D 1/00*    (2006.01)

(52) U.S. Cl. .......................... 701/41; 180/204
(58) Field of Classification Search .................. 180/204; 701/41, 42, 43, 44
See application file for complete search history.

(56) References Cited

U.S. PATENT DOCUMENTS

| 5,764,015 A | 6/1998 | Shimizu et al. | |
| 6,212,452 B1 | 4/2001 | Shimizu et al. | |
| 6,493,619 B2 * | 12/2002 | Kawazoe et al. | 701/41 |
| 7,265,510 B2 * | 9/2007 | Braeuchle et al. | 318/580 |
| 7,516,003 B2 * | 4/2009 | Maeda et al. | 701/41 |

FOREIGN PATENT DOCUMENTS

| DE | 196 35 892 | 3/1997 | |
| EP | 0 640 903 | 3/1995 | |
| FR | 2 780 696 | 1/2000 | |
| WO | WO 2010131102 A2 * | 11/2010 | |

* cited by examiner

*Primary Examiner* — Kevin Hurley
(74) *Attorney, Agent, or Firm* — Kenyon & Kenyon LLP

(57) ABSTRACT

In a method for deactivating a driver assistance system that influences the steering, a driver-independent system steering variable is applied to the steering wheel by the driver assistance system, the value of a driver steering variable applied to the steering wheel by the driver is determined, and the driver assistance system is deactivated dependent on the driver steering variable.

9 Claims, 2 Drawing Sheets

METHOD AND DEVICE FOR PROTECTING THE DRIVER DURING DRIVER-INDEPENDENT SUPERPOSITION OF STEERING MOMENTS

BACKGROUND OF THE INVENTION

1. Field of the Invention

The present invention relates to a method and a device for deactivating a driver assistance system that influences the steering system.

2. Description of Related Art

Driver assistance systems help the driver to manage the task of driving in an orderly fashion. Systems have long been available that intervene in the braking system (ABS, ESP) or in the drive train (e.g., Tempomat function), independent of the driver. Using newer electromechanical steering systems (e.g. EPS or Electric Power Steering), it is possible to produce haptic feedback sensations at the steering wheel by superposing steering moments, or even to steer the vehicle automatically. This offers new possibilities for driver assistance systems.

In a semi-autonomous parking assistance system, the system first calculates an optimal path for the parking process for the acquired parking space. From the acquired deviations between the path actually carried out and the optimal target path, the system attempts, with the aid of a controller, to produce the optimal steering action in order to guide the vehicle into the parking space as well as possible.

SUMMARY OF THE INVENTION

The present invention provides a method for deactivating a driver assistance system that influences the steering,
  in which the driver assistance system applies a driver-independent system steering variable to the steering wheel,
  the value of a driver steering variable applied to the steering wheel by the driver is determined, and
  dependent on the driver steering variable, the driver assistance system is deactivated.

In this way, injury to the driver is avoided by a driver assistance system that automatically actuates the steering wheel. In addition, in this way driver assistance systems can be deactivated for the case in which the driver removes his hands from the steering wheel and the driver assistance system should not steer without driver control.

In an example embodiment of the present invention, the system steering variable is a torque applied to the steering wheel by the driver assistance system independent of the driver, and/or a steering angle applied in this manner, and/or a angular steering velocity applied in this manner.

In an example embodiment of the present invention, the driver steering variable is a torque applied to the steering wheel by the driver, and/or is a steering angle applied in this manner, and/or is a angular steering velocity applied in this manner.

In an example embodiment of the present invention,
  the driver assistance system is a parking-assistant system, and
  the parking-assistant system is deactivated if the magnitude of the driver steering variable exceeds a predeterminable threshold value.

In this way, during the parking process a desired steering action of the driver that contradicts the driver assistance system can be recognized. The system is thereupon deactivated, and complete control of the parking process is given to the driver.

In an example embodiment of the present invention, the parking-assistant system is deactivated if the driver steering variable and the system steering variable, with respect to the steering direction, are oriented in opposite directions.

In an example embodiment of the present invention, the parking-assistant system is deactivated if the magnitude of the driver steering variable always exceeds a predeterminable threshold value during a time interval having a predeterminable length.

In this way, brief exceedings of the threshold value, caused for example by signal noise, are filtered out.

In an example embodiment of the present invention, the parking-assistant system is deactivated if the steering maneuvers assigned to the driver steering variable and to the system steering variable are always oriented in opposite directions, with respect to their steering direction, during a time interval of predeterminable length.

In an example embodiment of the present invention,
  the driver assistance system is a lane-keeping assistance system, and
  the lane-keeping assistance system is deactivated if the magnitude of the driver steering variable falls below a predeterminable threshold value.

In this way, it is recognized when the driver does not have his hands on the steering wheel, and the lane-keeping assistance system is thereupon deactivated.

In an example embodiment of the present invention, the lane-keeping assistance system is deactivated if the magnitude of the driver steering variable always falls below a predeterminable threshold value during a time interval having a predeterminable length.

In addition, the present invention provides a driver assistance system for influencing the steering, containing
  actuator means with which a driver-independent system steering variable is applied to the steering wheel,
  determining means with which the value of a driver steering variable applied to the steering wheel by the driver is determined, and
  deactivating means with which the driver assistance system is deactivated dependent on the driver steering variable.

DETAILED DESCRIPTION OF THE INVENTION

Through the measurement and, if required, evaluation of steering wheel quantities such as steering wheel angle, torque, and steering wheel angular speed, it is possible to recognize the driver's intention. On the basis of the measured or determined values, an activated driver assistance system can decide whether an existing superposition of moments should be interrupted by the system.

In a semi-autonomous parking assistant having automatic steering, steering moments are superposed on the steering wheel. If the moments transferred to the wheels in this way are greater than the frictional forces between the tires and the roadway, the vehicle then steers automatically. Here, the moments acting on the steering wheel can be up to 10 Nm, in order to continue to regulate the previously calculated trajectory at higher speeds.

For the safety of the driver, the steering speed (i.e., how fast the steering wheel rotates) is monitored. In addition, the steering moment applied manually by the driver to the steering wheel, referred to as the hand (or manual) moment, is also taken into account. If during the parking process the driver places his hands on the steering wheel, the time of this action is registered. If the driver holds the steering wheel, or if during a time interval of predetermined length (e.g. 200 ms) he steers against the automatically applied steering moment, the superposition then switches off; i.e., an automatic or driver-independent steering moment is no longer applied. The driver can then take over the control of the steering wheel. The driver is given an optical or acoustic warning of the switching off of the system. The optical warning can take place for example via an LED or via a text message in an instrument cluster or navigation system.

For some functions, such as lane-keeping assistance systems (e.g., LKS, or Lane Keeping Support), it is desirable for the driver to keep his hands on the steering wheel while the superposition of moments takes place. This is necessary in order to prevent the driver from misusing the lane keeping support system by allowing the system to steer by itself without his participation. For this purpose, the hand moment applied by the driver is determined from the difference between the hand moment acquired by a torque sensor and the steering wheel moment applied independent of the driver. The value of the steering wheel moment applied independent of the driver can be determined for example from the control quantities of the actuator that produces the driver-independent steering wheel moment.

The hand moment applied by the driver is continuously registered. If this hand moment disappears during a time interval having a predetermined length, the driver is informed by the system that he should keep his hands on the steering wheel. If the driver does not follow this instruction, the system informs the driver that the function is being deactivated.

Figure 1:
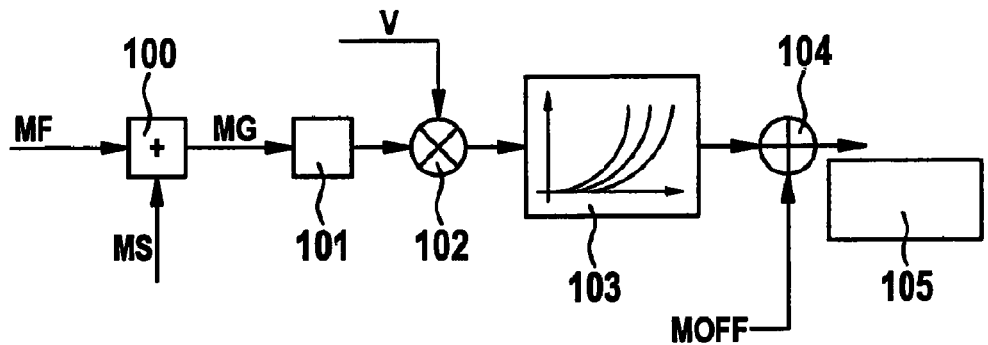
FIG. 1 shows a schematic diagram illustrating the signal flow of a steering assistance function.

FIG. 1 shows a schematic illustration of the signal flow of a driver assistance function. The input quantities are the hand moment MF exerted on the steering wheel by the driver and the driver-independent steering wheel moment MS. These are superposed in block 100, and together yield the overall torque MG that acts on the steering wheel. The overall moment MG is acquired in block 101 by a torque sensor. From the difference between the measured overall moment MG and the driver-independent steering wheel moment MS, determined for example on the basis of the control quantities of the steering actuator, the hand moment MF can be determined.

Subsequently, in block 102 an amplification of the overall moment MG by an amplification factor V takes place, and subsequent to this there takes place in a correction block 103 a correction, if necessary, of the amplified overall moment. Through this correction there takes place, for example, a taking into account of the current vehicle speed or a taking into account of the righting (or return) moment transferred to the tires by the roadway. In block 104, an offset correction value MOFF is added to the torque determined in block 103. This offset value compensates for example a loading of the vehicle that is asymmetrical in the transverse direction. The torque determined at the output of block 104 is communicated to control device 105 for the driver-independent steering.

Figure 2:
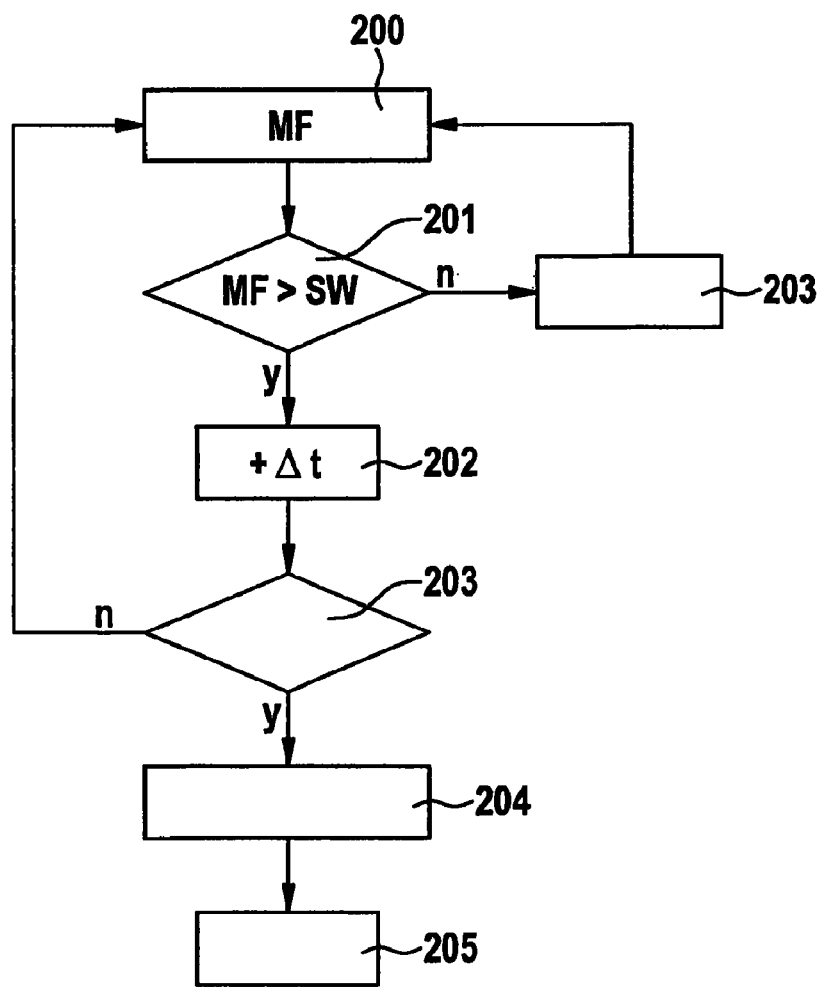
FIG. 2 shows a flowchart illustrating the sequence of the method according to the present invention.

An example of an evaluation algorithm is shown in FIG. 2. The method starts in block 200; there, the hand moment MF exerted on the steering wheel by the driver is determined, in particular its magnitude and its sign or direction. The hand moment can be determined from the difference between a measured overall moment and the driver-independent moment, which can be determined for example from control quantities. In block 201, it is determined whether MF exceeds a threshold value SW. Here, MF is given a positive sign if its direction is oriented opposite the direction of the driver-independent steering moment.

If the answer is "yes" (always designated "y" in FIG. 2), then in block 202 a time counter is incremented upward. This is designated by "+Δt." If the answer is "no," then in block 203 a time counter is set to 0, and branching subsequently takes place back to block 200. In block 203, it is queried whether the time counter has already exceeded a threshold value. If the answer is "no," then branching takes place back to block 200, and there the current hand moment is again determined. If the answer is "yes," i.e., the time counter has exceeded the threshold value, then in block 204 it is determined that the driver has taken over the steering. In block 205, the driver-independent steering interventions are thereupon switched off or deactivated. The described method is suitable for example for use in a semi-autonomous parking-assistant system.

For use in a lane-keeping assistance system, the method shown in FIG. 2 is modified only in block 201. The query is now |MF|<SW1, i.e., whether the magnitude of MF is lower than a threshold value SW1. If this threshold value, which in general is selected to be very low, is undershot, the conclusion is then drawn that the driver does not have his hands on the steering wheel. If this result is constantly repeated during a time interval of predetermined length, then in block 205 the driver-independent steering interventions are switched off or deactivated. The described method is suitable for example for use in a lane-keeping assistance system.

Figure 3:
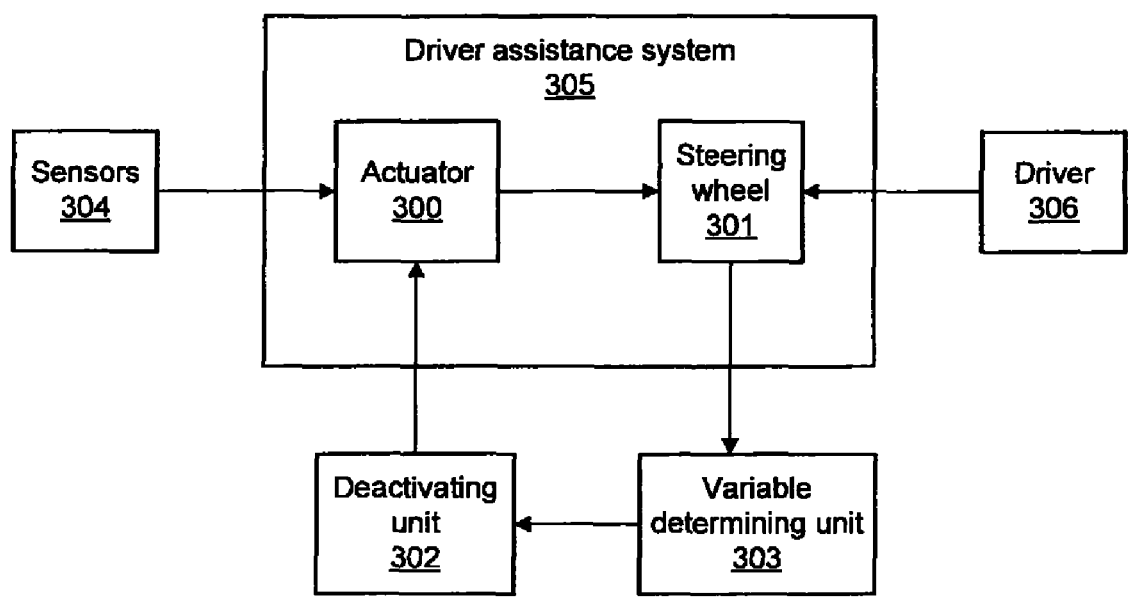
FIG. 3 shows a schematic diagram illustrating the design of the device according to the present invention.

The design of the system according to the present invention is shown in FIG. 3. Here, 300 designates actuator means that act on steering wheel 301, for example by applying a torque. Block 303 designates determining means with which the value of a driver steering variable MF applied to the steering wheel by a driver is determined. The driver is represented by block 306. Block 302 designates deactivating means with which driver assistance system 305 is deactivated dependent on the driver steering variable determined in block 303. Block 304 designates additional sensors on the basis of which, for example, a parking process desired by the driver or an activation of the lane keeping system desired by the driver is recognized. These additional sensors can also be switches that can be set or actuated by the driver, by which he activates the respective driver assistance system.

What is claimed is:

1. A method for selectively deactivating a driver assistance system that influences steering of a vehicle, comprising:
    applying a driver-independent system steering quantity to a steering wheel of the vehicle by the driver assistance system;
    determining a value of a driver steering quantity applied to the steering wheel by a driver; and
    deactivating the driver assistance system from influencing steering if the driver steering quantity and the driver-independent system steering quantity are oriented in opposite directions with respect to a steering direction.

2. The method as recited in claim 1, wherein the driver-independent system steering quantity is at least one of a torque, steering angle, and angular steering velocity applied in driver-independent fashion to the steering wheel by the driver assistance system.

3. The method as recited in claim 1, wherein the driver steering quantity is at least one of a torque, steering angle, and angular steering velocity applied to the steering wheel by the driver.

4. The method as recited in claim 1, wherein the driver assistance system is a parking-assistant system, and wherein the parking-assistant system is deactivated if the magnitude of the driver steering quantity exceeds a predetermined threshold value.

5. The method as recited in claim 4, wherein the parking-assistant system is deactivated if the magnitude of the driver steering quantity always exceeds the predetermined threshold value during a time interval having a predetermined length.

6. The method as recited in claim 1, wherein the parking-assistant system is deactivated if steering maneuvers corresponding to the driver steering quantity and to the driver-independent system steering quantity are always oriented in opposite directions with respect to the direction of steering during a time interval of a predetermined length.

7. A method for selectively deactivating a driver assistance system that influences steering of a vehicle, comprising:
applying a driver-independent system steering quantity to a steering wheel of the vehicle by the driver assistance system;
determining a value of a driver steering quantity applied to the steering wheel by a driver; and
deactivating the driver assistance system from influencing steering, as a function of the value of the driver steering quantity,
wherein the driver assistance system is a lane-keeping assistance system, and wherein the lane-keeping assistance system is deactivated if the magnitude of the driver steering quantity falls below a predetermined threshold value.

8. The method as recited in claim 7, wherein the lane-keeping assistance system is deactivated if the magnitude of the driver steering quantity always falls below the predetermined threshold value during a time interval of predetermined length.

9. A driver assistance system for influencing steering of a vehicle, comprising:
an actuator unit for applying a driver-independent system steering quantity to a steering wheel of the vehicle;
a variable determining unit for determining a value of a driver steering quantity applied to the steering wheel by the driver; and
a deactivating unit for deactivating the driver assistance system if the driver steering quantity and the driver-independent system steering quantity are oriented in opposite directions with respect to a steering direction.

* * * * *